Sept. 12, 1933. H. W. LORMOR ET AL 1,926,157
STORAGE BATTERY UNIT
Filed Jan. 20, 1930

Inventors.
Henry W Lormor
Leon A. Marshall
Kerr, Hudson & Kent
attys

Patented Sept. 12, 1933

1,926,157

UNITED STATES PATENT OFFICE 1,926,157

STORAGE BATTERY UNIT

Henry W. Lormor, Cleveland Heights, and Leon A. Marshall, East Cleveland, Ohio, assignors to Willard Storage Battery Company, Cleveland, Ohio, a corporation of West Virginia Application January 20, 1930. Serial No. 422,082

2 Claims. (Cl. 136—134)

This invention relates to improvements in storage battery units consisting of a post, a strap, and a set of plates of one polarity.

It has been common heretofore to form these units with a strap connecting the aligned lugs of the plates, the strap having a laterally extending portion upon which the terminal post is mounted. The plate lugs are connected with the strap in various ways, but principally by providing the strap with a series of either open or closed slots into which the plate lugs are caused to extend, these lugs being burned into the strap to form a mechanical and electrical connection. The mounting of the post out of alignment with the lugs, that is in an off-set position laterally, has been considered more or less essential heretofore in order to permit the economical assembly of the parts. We depart from this practice, mounting our terminal post above the center line of the strap, and overcoming the manufacturing difficulty by casting the strap to the lugs of the previously formed plates.

One of the objects of the invention is the provision of a construction in which a saving of material over that employed in previous constructions may be effected.

Another object is the provision of a construction in which the electrical path from post to plates is shortened.

Other objects and features of novelty will appear from the following description of the preferred embodiments of the invention which, for the purposes of the present application, are illustrated in the accompanying drawing, in which Figure 1 is a transverse vertical sectional view through the upper portion of a storage battery embodying the invention, the particular cell illustrated being shown in longitudinal section.

Figure 1:
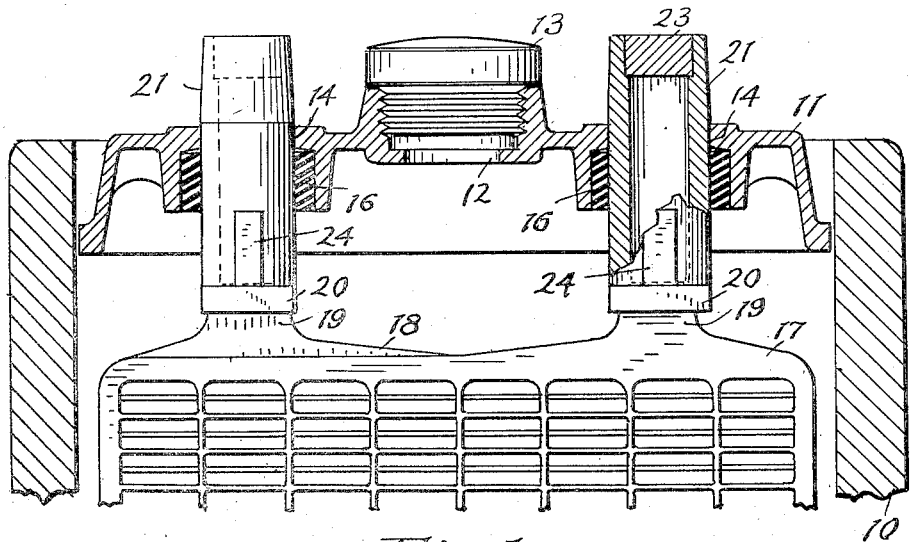
Figure 2:
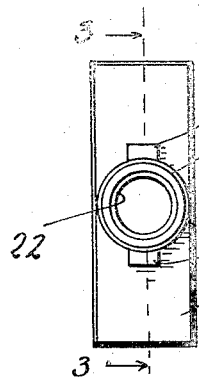
Fig. 2 is a plan view of the strap and post illustrated in Fig. 1.
Figure 3:
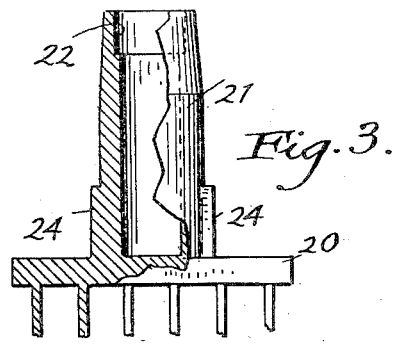
Fig. 3 is an elevational view, partly in section upon the line 3—3 of Fig. 2.

Referring to the drawing, a fragment of a battery box is indicated at 10, and one of the cell covers at 11. The latter is preferably provided with a filler opening 12 adapted to be closed by a vent plug 13. The cover also has openings 14 through which the posts of the battery element are adapted to extend, the joint between each post and the cover being preferably sealed by a soft rubber gasket 16. The foregoing are details of a known construction, and in the present instance merely form a convenient means of illustrating the application of this invention.

As is always the case, each complete battery element comprises two sets of plates 17 and 18 of opposite polarity alternately arranged in the completed element, and all of the plates have upwardly extending lugs 19. The lugs of each set or unit are arranged in alignment, and connected mechanically and electrically with a metal strap 20 which, in the present instance, is of simple rectangular form arranged directly above the lugs. Extending upwardly from this strap, and preferably cast integral with the same, is a tubular terminal post 21 provided at its upper end with a counter-bore 22 into which a flat circular pill 23 may be fitted and then burned to the post. The terminal posts of a storage battery, particularly in those batteries employed for automobile use, are subject to rather hard service, considering the necessarily soft character of the metal employed therein, and it is the practice to make these posts of larger diameter than would otherwise be necessary and of larger diameter than the intermediate posts of the battery. In order to secure as large a post as possible with a minimum amount of material and weight these posts are made hollow in the present invention and are reenforced at their upper ends by means of the pill or plug 23 which prevents the distortion and collapse of the upper end of the post when the terminal lugs are applied thereto. Furthermore, this construction facilitates the manufacture of these posts by casting inasmuch as the core may be introduced into the mold cavity to form the hollow interior of the post, and the closure of the outer end of the post effected by the pill 23 after the casting operation is completed.

The lower end of each post is provided with one or more outwardly extending projections or buttresses 24, preferably arranged symmetrically about a vertical plane extending transversely through the middle of the strap 20. The upper ends of these projections 24 are flat, and they serve to engage beneath the bushing 16 or other part of the cover for supporting the latter. Their symmetrical arrangement about the central plane of the strap insures the application of any force applied through the cover onto the strap along the median line thereof where it can be transmitted down into the plates 17 or 18, as the case may be, in a direct vertical line.

It will be noted that the post 21 is shown centrally arranged with respect to the length of the strap 20, but it will be apparent that the post may be positioned near one end of the strap. Other variations from the described structures may be resorted to. Accordingly we desire it to be understood that the scope of the invention is to be regarded as defined by the appended claims rather than by the foregoing description or the accompanying illustrations.

Having thus described our invention, we claim:

1. In a storage battery, a set of plates having lugs, a strap connecting the lugs of said plates, a tubular post formed integral with said strap, said tubular post being closed at its inner end and a reenforcing plug in the outer end of said tubular post.

2. In a storage battery, a set of plates having lugs, a strap of substantially uniform width connecting the lugs of said plates, a post extending upwardly from said strap, said post being hollow and its side walls merging directly into the top surface of the strap, said post comprising a pair of buttresses at its lower end arranged in a plane running lengthwise of the strap and of the post, and a reenforcing plug closing the outer end of said post.

HENRY W. LORMOR.
LEON A. MARSHALL.